US012065518B2

United States Patent
Clymans et al.

(10) Patent No.: US 12,065,518 B2
(45) Date of Patent: Aug. 20, 2024

(54) METHODS OF CONTROLLING SHUTDOWN OF REACTOR SYSTEMS

(71) Applicant: ExxonMobil Chemical Patents Inc., Baytown, TX (US)

(72) Inventors: Paul J. Clymans, Kapelle-Op-Den-Bos (BE); Jefferson P. Galliano, Singapore (SG); Philippe A. P. D'Hooghe, Merelbeke (BE); Cindy Dewitte, Puurs-Sint-Amands (BE); Henri A. Lammens, Antwerp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 609 days.

(21) Appl. No.: 17/309,175

(22) PCT Filed: Nov. 13, 2019

(86) PCT No.: PCT/US2019/061227
§ 371 (c)(1),
(2) Date: May 3, 2021

(87) PCT Pub. No.: WO2020/102388
PCT Pub. Date: May 22, 2020

(65) Prior Publication Data
US 2022/0025075 A1  Jan. 27, 2022

Related U.S. Application Data

(60) Provisional application No. 62/760,299, filed on Nov. 13, 2018.

(51) Int. Cl.
*C08F 2/01* (2006.01)
*B01J 3/04* (2006.01)
(Continued)

(52) U.S. Cl.
CPC ............. *C08F 2/01* (2013.01); *B01J 3/042* (2013.01); *B01J 19/002* (2013.01);
(Continued)

(58) Field of Classification Search
CPC ........ C08F 2/01; C08F 110/02; C08F 210/02; C08F 218/08; C08F 2400/02; C08F 2400/04; B01J 19/2415
See application file for complete search history.

(56) References Cited

U.S. PATENT DOCUMENTS 7,582,709 B2 * 9/2009 Goossens ................ C08F 10/02
422/138
8,048,971 B2 * 11/2011 Goossens ................ C08F 10/02
422/131
(Continued)

FOREIGN PATENT DOCUMENTS

WO  WO 2015/166297 A1 * 11/2015 ................ C08F 2/01
WO  WO 2017/146823 A1 *  8/2017 ............. B01J 19/24

*Primary Examiner* — Rip A Lee
(74) *Attorney, Agent, or Firm* — ExxonMobil Technology and Engineering Company

(57) ABSTRACT

Controlling the shutdown of a polyethylene reactor system that includes a secondary compressor, a reactor, a high pressure let down valve (HPLDV), a high-pressure separator, and a high-pressure recycle gas system is provided. After a partial or complete shutdown of secondary compressor, HPLDV opens to a pre-set open position until the reactor pressure reduces to either a pre-set reduced pressure limit or a until the slope of the reactor gas density to reactor pressure exceeds 0.15. The HPLDV controls the pressure to a pressure set point.

15 Claims, 4 Drawing Sheets

(51) Int. Cl.
  *B01J 19/00*   (2006.01)
  *C08F 110/02*  (2006.01)
  *C08F 210/02*  (2006.01)
  *C08F 218/08*   (2006.01)

(52) U.S. Cl.
  CPC ... *C08F 110/02* (2013.01); *B01J 2219/00162* (2013.01); *B01J 2219/00236* (2013.01); *B01J 2219/00259* (2013.01); *B01J 2219/0027* (2013.01); *C08F 218/08* (2013.01); *C08F 2400/04* (2021.01)

(56) References Cited

U.S. PATENT DOCUMENTS

| | | | | |
|---|---|---|---|---|
| 9,371,406 | B2* | 6/2016 | Cornelissen | B01J 19/2415 |
| 9,441,057 | B1* | 9/2016 | Littmann | C08F 2/01 |
| 10,273,318 | B2* | 4/2019 | Hosman | C08F 2/34 |
| 10,308,729 | B2* | 6/2019 | Clymans | C08F 2/01 |
| 10,478,796 | B2* | 11/2019 | Lammens | C08F 2/00 |
| 10,570,226 | B2* | 2/2020 | Lammens | B01J 19/0006 |
| 10,835,882 | B2* | 11/2020 | Clymans | B01J 3/02 |
| 2010/0004407 | A1 | 1/2010 | Goossens et al. | |
| 2018/0030160 | A1 | 2/2018 | Wolfram et al. | |
| 2019/0338053 | A1 | 11/2019 | Neumann et al. | |

* cited by examiner

Figure 2: Reactor gas density as function of Reactor pressure

METHODS OF CONTROLLING SHUTDOWN OF REACTOR SYSTEMS

CROSS-REFERENCE OF RELATED APPLICATIONS

This application is a National Phase Application claiming priority to PCT Application Serial No. PCT/US2019/061227, filed Nov. 13, 2019, which claims the benefit to U.S. Provisional Application Ser. No. 62/760,299, filed Nov. 13, 2018, the disclosures of which are hereby incorporated by reference in their entirety.

FIELD OF THE INVENTION

This application relates to methods for controlling the shutdown of reactor systems, and in particular, the evacuation of reactor vessel contents in a polyethylene production facility following a process interruption.

BACKGROUND OF THE INVENTION

Polyethylene is a lightweight, durable thermoplastic with variable crystalline structure. It is one of the most widely produced plastics in the world, with tens of millions of tons produced worldwide each year. Polyethylene is used in applications ranging for films, tubes, plastic parts, laminates, etc. in several markets (packaging, automotive, electrical, etc.).

Chemically, polyethylene is made from the polymerization of ethylene monomer. Polyethylene chemical formula is $(C_2H_4)_n$. It is commercially produced in a number of forms, such as low density polyethylene, high density polyethylene, and linear low density polyethylene. Low density polyethylene (LDPE) in particular is a semi-rigid and translucent polymer and, compared to high density polyethylene, it has a higher degree of short and long side-chain branching. LDPE is generally produced at high pressure (such as 1500 bar) via free radical polymerization process. LDPE is composed of 4,000-40,000 carbon atoms, exhibits a melting point of 105° C. to 115° C., and a density of 0.910-0.940 g/cm³.

High pressure reactors are widely used for the polymerization of ethylene at high pressure, for example, pressures of over 1000 bar, and up to 3000 bar or higher. Fresh ethylene from an ethylene supply is compressed to reactor pressure typically by a combination of a primary compressor, which compresses the ethylene to an intermediate pressure (around 300 bar) and a secondary compressor, which compresses the fresh ethylene together with recycled ethylene from that intermediate pressure up to the final reactor pressure (around 3100 bar). As the ethylene flows into the reactor an initiator is also injected, and the ethylene is polymerized to give a mixture comprising, principally, polyethylene and unreacted monomer. That mixture leaves the reactor through a valve, which is generally referred to as a high pressure let down valve, and then enters a separation system in which unreacted monomer is separated from the polyethylene and recycled back to the compressor system. One of skill in the art will recognize that the two most comment reactor types for polymerization of ethylene are tubular-style reactors and autoclave-style reactors. The methods described in the present application may be applied to either style of reactor system.

One known separation system uses two separation vessels arranged in series. The first separation vessel, which may be referred to as the high-pressure separation vessel, has an inlet for the product mixture coming from a high pressure let down valve, an outlet for the separated, unreacted monomer (referred to as "off gas") and an outlet for a stream that comprises the polyethylene and approximately 30-40 wt % unreacted, entrained ethylene. The off gas is recycled back to the compressor process through a high-pressure gas system, while the stream that comprises the polyethylene and approximately 30-40 wt % unreacted, entrained ethylene passes into a low pressure separation vessel, where almost all of the remaining unreacted ethylene is separated from the polyethylene. Background references include U.S. Patent Application Publication No. 2010/0004407.

Typically, the high-pressure separation vessel will operate at a pressure such that the off gas can be recycled to the suction of the secondary compressor. The low pressure separator operates at a much lower pressure, and the off gas from the low pressure separator must be recycled to the suction of the primary compressor.

When the LDPE production process experiences a process interruption, actions must be taken to ensure the safety of the facility, to minimize the environmental impact, and to reduce any harm to the process equipment. If the primary or secondary compressor experiences a shut-down, steps must be taken to ensure that the contacts of the reactor are quickly and safely evacuated from the reactor vessel. This is due to the fact that if the reactor contents are allowed to stagnate, the reactor itself may suffer extensive damage. Thus, upon compressor trip, the reactor contents are sent to the high-pressure separation vessel and on through the high-pressure gas system. However, the reactor content is larger than the high-pressure separation vessel and on through the high-pressure gas system, and so excess reactor contents must be vented to a flare, a dump stack, or even to atmosphere. Thus, there is a need for controlling reactor shutdown during these interruptions.

SUMMARY OF THE INVENTION

In a class of embodiments, the invention provides for a method of controlling shutdown of a polyethylene reactor system comprising:
  providing a polyethylene reactor system comprising a suction heater and drum 150, a primary compressor 152, a secondary compressor 154, a reactor 156, a high pressure let down valve 130, a high-pressure separator 158, and a high-pressure recycle gas system 160;
  wherein the reactor 156 operates at a pressure of about 3000 bar-g;
  experiencing a partial or complete shutdown of secondary compressor 154;
  opening the HPLDV 130 to a pre-set open position until the reactor 156 pressure reduces to either a pre-set reduced pressure limit or a until the slope of the reactor gas density to reactor pressure exceeds 0.15;
  after reactor 156 pressure reduces to either the pre-set reduced pressure limit or after the slope of the reactor gas density to reactor pressure exceeds 0.15:
  controlling the HPLDV 130 to control the pressure in line 114 that connects the high-pressure separator 158 outlet to the inlet of the high-pressure recycle gas system 160 to a pressure set point that is approximately 10 bar-g less than the pressure that would cause the high-pressure recycle gas system 160 to vent to avoid overpressure;
  controlling the flow in first compressor recycled ethylene line 132 that recycles ethylene from the primary compressor outset to the ethylene feed line to the suction heater and drum 150 using valve 134;

allowing the flow of ethylene leaving the high-pressure recycle gas system 160 to travel through first compressor recycled ethylene line 132 that recycles ethylene from the primary compressor outset to the ethylene feed line 100 to the suction heater and drum 150;

removing the ethylene from purge recycled ethylene line 122 to a liquid storage facility and optionally also removing the ethylene from makeup ethylene line 102 to an ethylene header.

In another class of embodiments, the invention provides for a method of controlling shutdown of a polyethylene reactor system comprising:

providing a polyethylene reactor system comprising a suction heater and drum 150, a primary compressor 152, a secondary compressor 154, a reactor 156, a high pressure let down valve 130, a high-pressure separator 158, and a high-pressure recycle gas system 160;

wherein the reactor 156 operates at a pressure of about 3000 bar-g;

the suction heater and drum 150 receives ethylene from an ethylene feed line 100 which receives ethylene from a makeup ethylene 102 line, a purge recycled ethylene line 122, and a first compressor recycled ethylene line 132, ethylene leaves the suction heater and drum 150 and is transported to the primary compressor 152 through a line 104, the primary compressor compresses the ethylene and sends it on to the secondary compressor 154 through a line 106, and a portion of the ethylene exiting the secondary compressor 154 is recycled back to the ethylene feed line 100 through first compressor recycled ethylene line 132;

the line 106 receives a high-pressure recycle gas through line 128 and enters secondary compressor 154, the secondary compressor 154 compresses the ethylene and sends it on the reactor 156 where a portion of the ethylene reacts in the presence of an initiator to form polyethylene;

the material exiting reactor 156 passes through a High Pressure Let Down Valve (HPLDV) 130 before entering a high-pressure separator 158;

the high-pressure separator 158 separates a portion of unreacted ethylene from the material exiting reactor 156, and sends the unreacted ethylene to high-pressure recycle gas system 160 through line 114;

experiencing a partial or complete shutdown of secondary compressor 154;

opening the HPLDV 130 to a pre-set open position until the reactor 156 pressure reduces to either a pre-set reduced pressure limit or a until the slope of the reactor gas density to reactor pressure exceeds 0.15;

after reactor 156 pressure reduces to either the pre-set reduced pressure limit or after the slope of the reactor gas density to reactor pressure exceeds 0.15:

controlling the HPLDV 130 to control the pressure in line 114 to a pressure set point that is approximately 10 bar-g less than the pressure that would cause the high-pressure recycle gas system 160 to vent to avoid overpressure;

controlling the flow in first compressor recycled ethylene line 132 using valve 134;

allowing the flow of ethylene leaving the high-pressure recycle gas system 160 to travel through line 128, into line 106, and through first compressor recycled ethylene line 132 back to ethylene feed line 100 and into either purge recycled ethylene line 122 or makeup ethylene line 102;

removing the ethylene from purge recycled ethylene line 122 to a liquid storage facility and optionally also removing the ethylene from makeup ethylene line 102 to an ethylene header.

In yet another class of embodiments, the invention provides for a method of controlling shutdown of a polyethylene reactor system comprising:

providing a polyethylene reactor system comprising a suction heater and drum 150, a primary compressor 152, a secondary compressor 154, a reactor 156, a high pressure let down valve 130, a high-pressure separator 158, and a high-pressure recycle gas system 160;

wherein the reactor 156 operates at a pressure of about 3000 bar-g;

the suction heater and drum 150 receives ethylene from an ethylene feed line 100 which receives ethylene from a makeup ethylene 102 line, a purge recycled ethylene line 122, and a first compressor recycled ethylene line 132, ethylene leaves the suction heater and drum 150 and is transported to the primary compressor 152 through a line 104, the primary compressor compresses the ethylene and sends it on to the secondary compressor 154 through a line 106, and a portion of the ethylene exiting the secondary compressor 154 is recycled back to the ethylene feed line 100 through first compressor recycled ethylene line 132;

the line 106 receives a high-pressure recycle gas through line 128 and enters secondary compressor 154, the secondary compressor 154 compresses the ethylene and sends it on the reactor 156 where a portion of the ethylene reacts in the presence of an initiator to form polyethylene;

the material exiting reactor 156 passes through a High Pressure Let Down Valve (HPLDV) 130 before entering a high-pressure separator 158;

the high-pressure separator 158 separates a portion of unreacted ethylene from the material exiting reactor 156, and sends the unreacted ethylene to high-pressure recycle gas system 160 through line 114;

experiencing a partial or complete shutdown of secondary compressor 154;

opening the HPLDV 130 to a pre-set open position of between 100% open and 85% open until the reactor 156 pressure reduces to either a 1500 bar-g or a until the slope of the reactor gas density to reactor pressure exceeds 0.15;

after reactor 156 pressure reduces to either the pre-set reduced pressure limit or after the slope of the reactor gas density to reactor pressure exceeds 0.15:

controlling the HPLDV 130 to control the pressure in line 114 to a pressure set point that is approximately 10 bar-g less than the pressure that would cause the high-pressure recycle gas system 160 to vent to avoid overpressure;

controlling the flow in first compressor recycled ethylene line 132 using valve 134;

allowing the flow of ethylene leaving the high-pressure recycle gas system 160 to travel through line 128, into line 106, and through first compressor recycled ethylene line 132 back to ethylene feed line 100 and into either purge recycled ethylene line 122 or makeup ethylene line 102;

removing the ethylene from purge recycled ethylene line 122 to a liquid storage facility and optionally also removing the ethylene from makeup ethylene line 102 to an ethylene header.

DETAILED DESCRIPTION OF THE INVENTION

This application relates to systems and methods for controlling evacuation of reactor vessel contents in a polyethylene production facility following a process interruption.

The polyethylene production process consists of three essential operations. First, gaseous ethylene is supplied (and generally combined with recycled ethylene) and compressed in a series of one or more compressors. Second, the compressed ethylene is combined with an initiator (an organic peroxide) and, optionally, a co-monomer in a reactor where polymerization occurs at elevated pressure and temperature. Finally, the product exiting the reactor is treated through a series of separators to extract the desired product from unreacted ethylene and other components.

Figure 1:
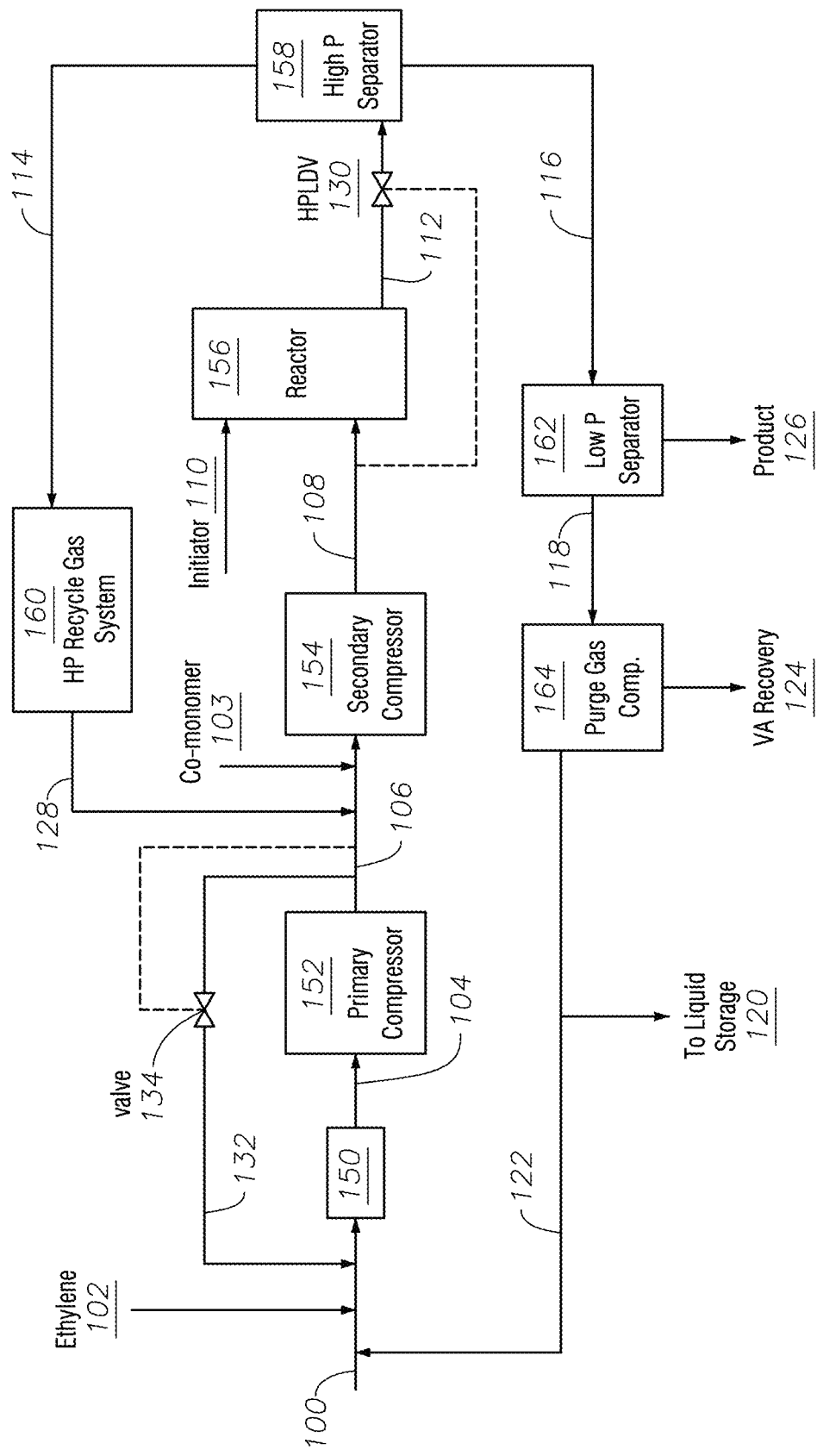
FIG. 1 illustrates a diagram of a polyethylene production process, showing control of key valves during normal operation.

A representative process flow diagram is shown in FIG. 1 during a normal polyethylene production operation. The process beings with ethylene feed 100, which is made up of makeup ethylene 102 and purge recycled ethylene 122 and first compressor recycled ethylene line 132. Ethylene feed 100 enters suction heater and drum 150 and exits through line 104 into primary compressor 152. Suction heater and drum 150 heats material and to control suction temperature and offers pressure dampening using buffer volume. The ethylene exits the primary compressor 152 through line 106. A portion of the ethylene exiting the primary compressor 152 through line 106 is recycled to be fed back to suction heater and drum 150 through first compressor recycled ethylene line 132, the volume returned through first compressor recycled ethylene line 132 is controlled based on the pressure in line 106 measured after the first compressor recycled ethylene line 132 is removed using valve 134. The pressure in line 106 is typically between 180 to 280 bar-g. Ethylene not recycled through first compressor recycled ethylene line 132continues through line 106 where it may be optionally combined with co-monomer 103 and high-pressure recycle gas in line 128 before entering secondary compressor 154. The suction pressure entering secondary compressor 154 is typically between 180 and 280 bar-g and the discharge pressure is typically between 2100 and 3100 bar-g for tubular-style and the discharge pressure is typically between1000 and 2200 bar-f for autoclave-style reactor. The gas exiting secondary compressor 154 is fed into reactor 156 through line 108 along with initiator 110.

Suitable co-monomers include vinyl ethers such as vinyl methyl ether and vinyl phenyl ether, olefins such as propylene, 1-butene, 1-octene and styrene, vinyl esters such as vinyl acetate, vinyl butyrate and vinyl pivalate, haloolefins such as vinyl fluoride and vinylidene fluoride, acrylic esters such as methyl acrylate, ethyl acrylate and methacrylates, other acrylic or methacrylic compounds such as acrylic acid, methacrylic acid, maleic acid, acrylonitrile and the acrylamides, and other compounds such as allyl alcohol, vinyl silanes, and other copolymerisable vinyl compounds.

Many suitable initiators are known to the skilled person. Organic peroxides are a preferred class of initiators. In some instances, a mixture of several initiators having different decomposition temperatures may be used in order to provide ongoing generation of free radicals as the temperature of the reaction mixture changes.

Inside reactor 156 the ethylene, initiator, and optional co-monomer react at elevated temperatures ranging from about 130° C. to about 340° C. and pressures ranging from about 100 bar-g to about 3100 bar-g to form polyethylene. The reactor is generally able to convert about 15-40% of the ethylene entering the reactor into polyethylene, where autoclave-type reactors have a conversion rate of approximately 15-20% and tubular reactors have a conversion rate of approximately 25-40%.

The product stream leaving reactor 156 will include, in addition to polyethylene and unreacted ethylene, other substances such as initiator residues and, potentially, one or more chain transfer agents. The product stream exits the reactor through line 112 where it passes through High Pressure Let Down Valve (HPLDV) 130 before entering high-pressure separator 158. The HPLDV is controlled based on the pressure in line 108 that supplies the ethylene, and optional co-monomer, to reactor 156. The pressure in high-pressure separator 158 is generally controlled to at or below 315 bar-g.

The high-pressure separator separates out unreacted ethylene ("off gas"), which exits through line 114 to the high-pressure recycle gas system 160, the remaining gas exits the high-pressure separator 158 through line 116 to the low-pressure separator 162. The remaining gas sent to low-pressure separator 162 comprises the polyethylene, unreacted ethylene, and other substances such as initiator residues and optionally one or more chain transfer agents.

At the low-pressure separator 162, the polyethylene product stream 126 is separated from the unreacted ethylene and other substances, which are transferred to purge gas compressor 164 through line 118. Purge gas compressor 164 separates the remaining ethylene from the other substances, recycling the ethylene through line 122 and removing the other substances through line 124. When desired, a portion of the ethylene exiting purge gas compressor 164 can be removed from the system through line 120 and sent to liquid purification and storage.

If, for some reason, secondary compressor 154 experiences a shutdown, reactor 156 will experience a drop in operating pressure. To avoid venting reactor contents to a flare, a dump stack, or even to atmosphere, the systems and method of the present invention propose to initiate feedforward controls that allow the reactor contents to be safely vented into high-pressure separator 158 and high-pressure recycle gas system 160.

At high reactor pressures, the reactor gas density does not drop significantly, and so the mass of the reactor contents sent on to high-pressure separator 158 is relatively small. However, as the reactor pressure falls below a certain pressure, the density of the reactor gas drops rapidly, leading to a rapid increase in the mass exiting the reactor. This can be seen in FIG. 2, which shows the reactor gas density as a function of reactor pressure for an example reactor.

Figure 2:
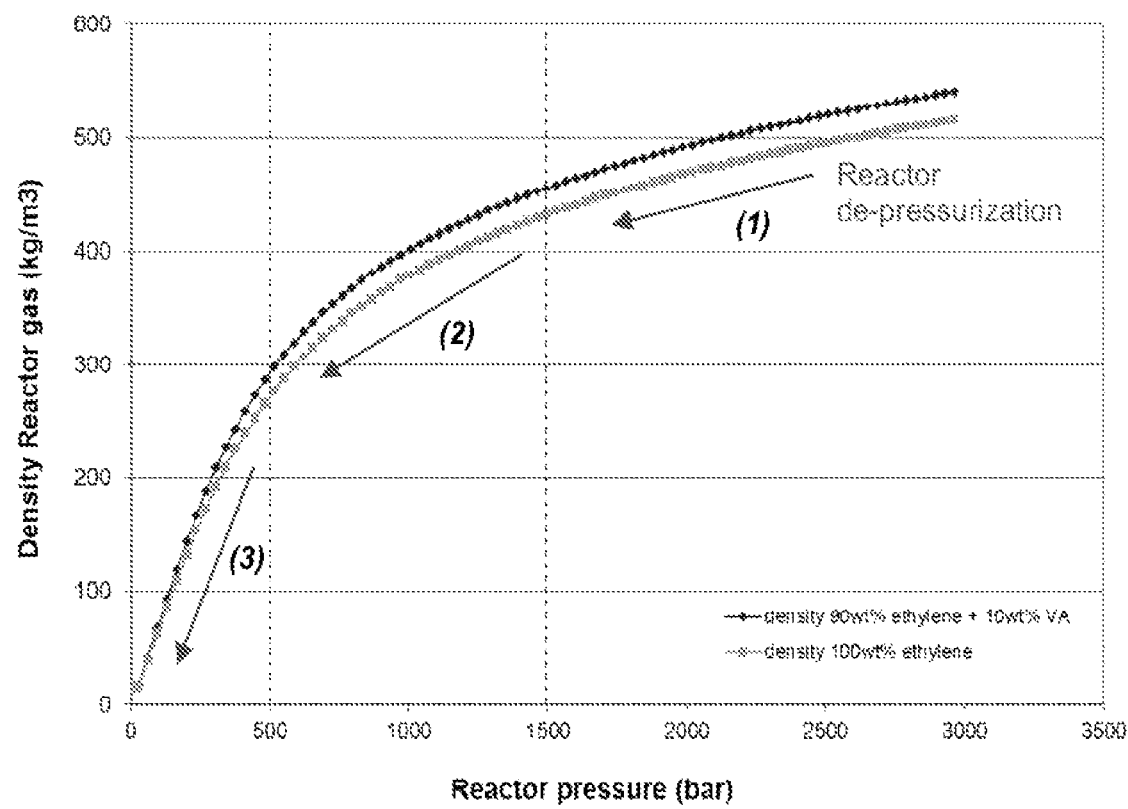
FIG. 2 illustrates reactor gas density as a function of reactor pressure.

As can be seen, for the three zones shown in FIG. 2, the average slop of density to pressure for zone 1 is 0.06 (from 3000-1500 bar-g), for zone 2 is 0.16 (from 1500-500 bar-g), and for zone 3 is 0.54 (from 500-0 bar-g). This allows the contents of the reactor to be rapidly sent to high-pressure separator 158 and high-pressure recycle gas system 160 without over burdening those systems so long as the reactor pressure is at or above 1500 bar-g, in this example. FIG. 2 shows the relationship between reactor density and reactor pressure for 100% ethylene feed and for a monomer feed comprising 90% ethylene and 10% vinyl acetate. Where vinyl acetate is used as a co-monomer, it is generally included from about 10-30% of the monomer feed to the reactor.

Considering the relationship between reactor gas density and reactor pressure, as an initial step, upon trip of secondary compressor 154, HPLDV is set to a pre-set open position until the reactor contents reduce to a pre-set reduced pressure limit or until the slope of the reactor gas density to reactor pressure reaches a predetermined upper limit. Thus, in some embodiments, the HPLDV may be set to 100-85% open until the reactor pressure reaches 1500 bar-g. In other embodiments, the HPLDV may be set to 100-85% open until the slope of the reactor gas density to reactor pressure exceeds 0.15. In some circumstances, the pre-set open position is set to be the last control position the valve was in before the trip of the secondary compressor.

Figure 3:
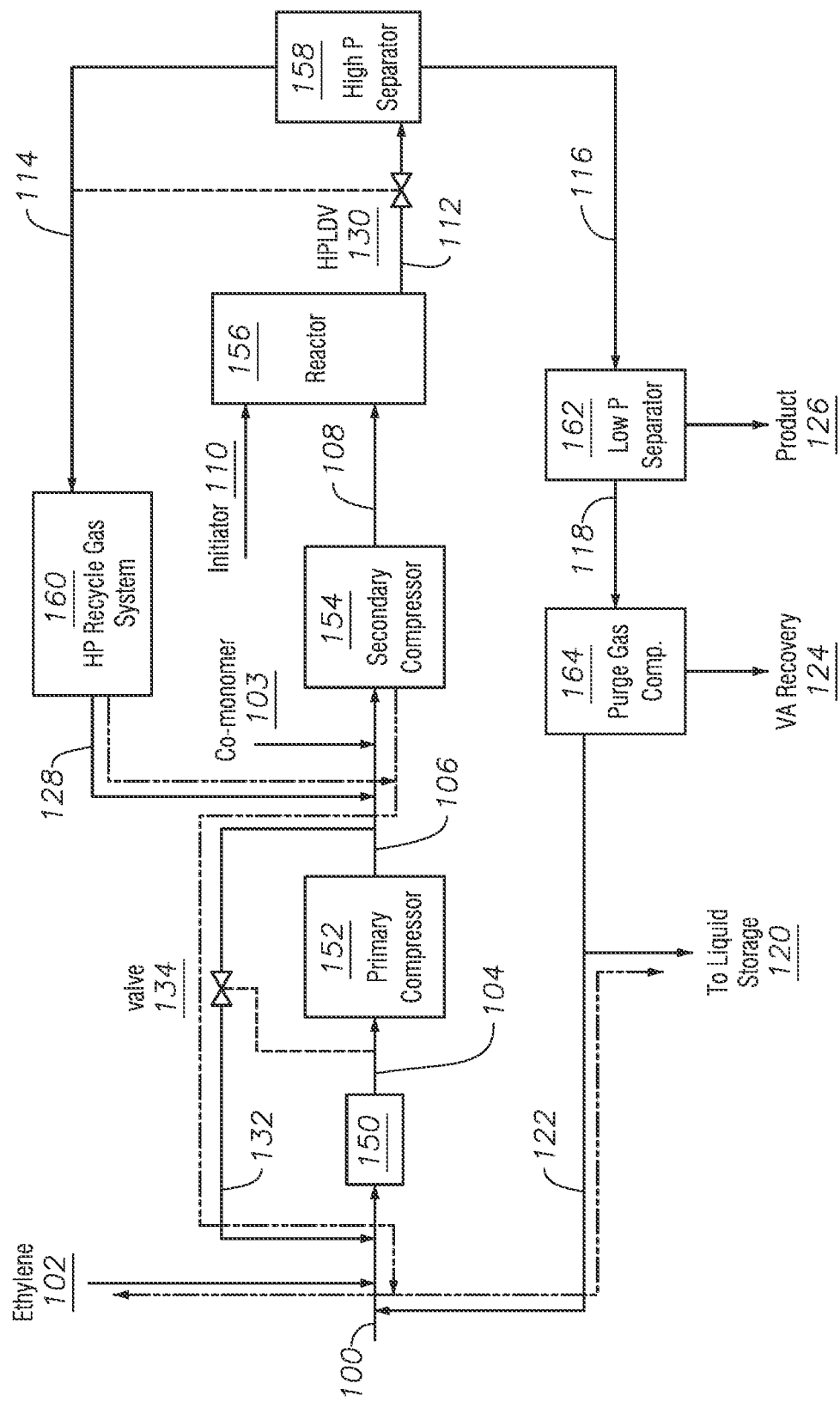
FIG. 3 illustrates a diagram of a polyethylene production process, showing control of key valves following a process interruption.

Thus, once a known reactor pressure or density/pressure slope is reached, it is necessary to implement further feed-forward controls to continue to empty the reactor without over-loading high-pressure separator 158 and high-pressure recycle gas system 160. These further feed-forward controls are shown in FIG. 3.

Initially, the HPLDV changes control at a reactor pressure of 1500 bar-g from the pre-set open position (such as from 100-85% open) to control based on the pressure in line 114 between high-pressure separator 158 and high-pressure recycle gas system 160, the pressure set point is set to avoid overpressure. That is, the pressure set point should be controlled to be approximately 10 bar-g less than the pressure that would cause the high-pressure recycle gas system 160 to have to vent to avoid overpressure. In some embodiments, the vent to atmosphere pressure in line 114 between high-pressure separator 158 and high-pressure recycle gas system 160 might be 300 bar-g to 350 bar-g, which would result in a pressure set point in line 114 of between about 290 bar-g and 340 bar-g Further feed-forward controls can also be implemented to control the overall system pressure. The first option, shown in FIG. 3, is to allow ethylene in the system to reverse flow back into an ethylene header (not shown). In this system, the flow of ethylene through ethylene feed 100 is fully reversed, as is the flow of ethylene through makeup ethylene 102. Additionally, the control of the volume returned through first compressor recycled ethylene line 132 maintained using valve 134, which is controlled based on the pressure in line 104, between suction heater and drum 150 and primary compressor 152, to allow rapid ethylene flow back to ethylene feed line 100 and on to the ethylene header. However, valve 134 must bet set to allow maximum flow back without over-pressuring the ethylene feed system. Thus, the set point for valve 134 is controlled as the maximum open that still maintains the pressure in the ethylene feed system at 10-15% below the pressure at which the safety valve setting would be tripped. As these flows are reversed, it reduces the pressure in high-pressure recycle gas system 160, which allows the flow from high-pressure recycle gas system 160 through line 128 to travel back through line 106, through first compressor recycled ethylene line 132, into ethylene feed line 100, and finally back to the ethylene header. In this first option, the spillback is allowed to proceed as rapidly as possible to reduce the pressure in overall system. If it is undesirable for the gas to be recycled to the ethylene header for some reason (such as concerns about gas contamination), the alternative is by the purge recycled ethylene line 122 fluidly connected to an appropriate liquid storage unit, preferably to a purge gas purification unit (not shown).

Figure 4:
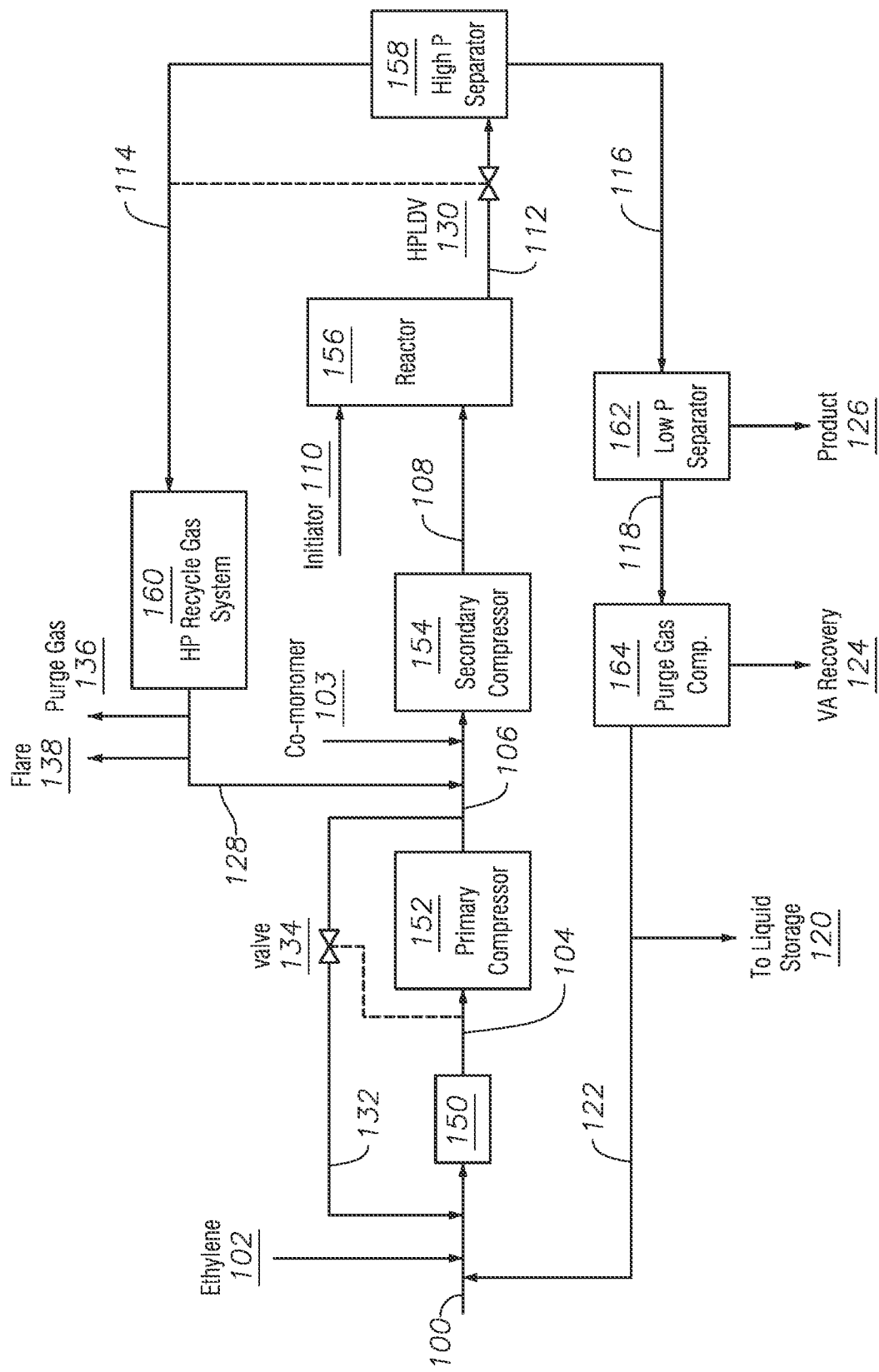
FIG. 4 illustrates a diagram of a polyethylene production process, showing alternate gas pressure relief options.

The second option, shown in FIG. 4, is to remove gas from high-pressure recycle gas system 160 from line 128 through purge gas line 136. In the second option, the gas removed is ethylene and it is sent to liquid storage outside of the system. The second option requires that the high-pressure recycle gas system 160 from line 128 is fluidly connected to an appropriate liquid storage unit, preferably to a purge gas purification unit (not shown).

The third option, also shown in FIG. 4, to is remove gas from high-pressure recycle gas system 160 from line 128 and to send that gas to a flare system 138 for safe combustion, avoiding direct release to atmosphere.

When reference is made to control variables for valves such as HPLDV 130, it will be understood that such control is part of a plant distribution control system includes a computer system that is adapted comprises: a processor; and a tangible, machine-readable storage medium that stores machine-readable instructions for execution by the processor, the machine-readable instructions corresponding to one or more of the methods described herein. That is, the methods described herein can be performed on computing devices (or processor-based devices) that are part of the plant distribution control system and include a processor; a memory coupled to the processor; and instructions provided to the memory, wherein the instructions are executable by the processor to perform the methods described herein. The instructions can be a portion of code on a non-transitory computer readable medium. Any suitable processor-based device may be utilized for implementing all or a portion of embodiments of the present techniques, including without limitation personal computers, networks personal computers, laptop computers, computer workstations, mobile devices, multi-processor servers or workstations with (or without) shared memory, high performance computers, and the like. Moreover, embodiments may be implemented on application specific integrated circuits (ASICs) or very large scale integrated (VLSI) circuits.

The terms "non-transitory, computer-readable medium," "tangible machine-readable medium," or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

A transmission medium (e.g., for communications between the plant distribution control system and components of a polyethylene production operation shown in FIG. 1) may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of controlling shutdown of a polyethylene reactor system comprising:
   providing a polyethylene reactor system comprising a suction heater and drum 150, a primary compressor 152, a secondary compressor 154, a reactor 156, a high pressure let down valve (HPLDV) 130, a high-pressure separator 158, and a high-pressure recycle gas system 160;
   wherein the reactor 156 operates at a pressure of about 3000 bar-g;
   experiencing a partial or complete shutdown of secondary compressor 154;
   opening the HPLDV 130 to a pre-set open position until a reactor 156 pressure reduces to either a pre-set reduced pressure limit or until a slope of the reactor gas density to reactor pressure exceeds 0.15;
   after reactor 156 pressure reduces to either the pre-set reduced pressure limit or after the slope of the reactor gas density to reactor pressure exceeds 0.15:
   controlling the HPLDV 130 to control the pressure in line 114 that connects the high-pressure separator 158 outlet to an inlet of the high-pressure recycle gas system 160 to a pressure set point that is approximately 10 bar-g less than the pressure that would cause the high-pressure recycle gas system 160 to vent to avoid overpressure;
   controlling a flow in first compressor recycled ethylene line 132 that recycles ethylene from a primary compressor outset to an ethylene feed line 100 to the suction heater and drum 150 using valve 134;
   allowing a flow of ethylene leaving the high-pressure recycle gas system 160 to travel through first compressor recycled ethylene line 132 that recycles ethylene from the primary compressor outset to the ethylene feed line 100 to the suction heater and drum 150;
   removing ethylene from purge recycled ethylene line 122 to a liquid storage facility and optionally also removing ethylene from makeup ethylene line 102 to an ethylene header.

2. The method of claim 1, wherein after experiencing a partial or complete shutdown of secondary compressor, the pre-set open position of the HPLDV is set to between 100% open and 85% open.

3. The method of claim 2, wherein after experiencing a partial or complete shutdown of secondary compressor, HPLDV remains at the pre-set open position until the reactor reaches a pre-set reduced pressure limit of at or below 1500 bar-g.

4. The method of claim 2, wherein after experiencing a partial or complete shutdown of secondary compressor, HPLDV remains at the pre-set open position until the slope of the reactor gas density to reactor pressure exceeds 0.15.

5. The method of claim 1, wherein
allowing the flow of ethylene leaving the high-pressure recycle gas system to travel through line 128, into line 106, and through first compressor recycled ethylene line 132 back to ethylene feed line 100, a feed is sent into either purge recycled ethylene line 122 and not to makeup ethylene line 102.

6. The method of claim 1, wherein
allowing the flow of ethylene leaving the high-pressure recycle gas system to travel through line 128, into line 106, and through first compressor recycled ethylene line 132 back to ethylene feed line 100, a feed is sent into both purge recycled ethylene line 122 and to makeup ethylene line 102.

7. The method of claim 1, wherein
removing the ethylene from purge recycled ethylene line 122 to a liquid storage facility also includes removing the ethylene from makeup ethylene line 102 to an ethylene header.

8. The method of claim 1, wherein at least a portion of gas is removed from high-pressure recycle gas system 160 either through a purge gas line 136, a flare system 138, or both.

9. A method of controlling shutdown of a polyethylene reactor system comprising:
 (a) providing a polyethylene reactor system comprising a suction heater and drum 150, a primary compressor 152, a secondary compressor 154, a reactor 156, a high pressure let down valve 130, a high-pressure separator 158, and a high-pressure recycle gas system 160; wherein:
  the reactor 156 operates at a pressure of about 3000 bar-g;
  the suction heater and drum 150 receives ethylene from an ethylene feed line 100 which receives ethylene from a makeup ethylene line 102, a purge recycled ethylene line 122, and a first compressor recycled ethylene line 132,
  ethylene leaves the suction heater and drum 150 and is transported to the primary compressor 152 through a line 104, the primary compressor compresses ethylene and sends it on to the secondary compressor 154 through a line 106, and a portion of ethylene exiting the secondary compressor 154 is recycled back to the ethylene feed line 100 through first compressor recycled ethylene line 132;
  the line 106 receives a high-pressure recycle gas through line 128 and enters secondary compressor 154, the secondary compressor 154 compresses ethylene and sends it on the reactor 156 where a portion of the ethylene reacts in a presence of an initiator to form polyethylene;
  a material exiting reactor 156 passes through a high pressure let down valve (HPLDV) 130 before entering a high-pressure separator 158; and
  the high-pressure separator 158 separates a portion of unreacted ethylene from the material exiting reactor 156, and sends the unreacted ethylene to high-pressure recycle gas system 160 through line 114;
 (b) experiencing a partial or complete shutdown of secondary compressor 154;
 (c) opening the HPLDV 130 to a pre-set open position until a reactor 156 pressure reduces to either a pre-set reduced pressure limit or a until a slope of the reactor gas density to reactor pressure exceeds 0.15;
 (d) after reactor 156 pressure reduces to either the pre-set reduced pressure limit or after the slope of the reactor gas density to reactor pressure exceeds 0.15:
  controlling the HPLDV 130 to control a pressure in line 114 to a pressure set point that is approximately 10 bar-g less than a pressure that would cause the high-pressure recycle gas system 160 to vent to avoid overpressure;
  controlling a flow in first compressor recycled ethylene line 132 using valve 134;
  allowing a flow of ethylene leaving the high-pressure recycle gas system 160 to travel through line 128, into line 106, and through first compressor recycled ethylene line 132 back to ethylene feed line 100 and into either purge recycled ethylene line 122 or makeup ethylene line 102; and
  removing ethylene from purge recycled ethylene line 122 to a liquid storage facility and optionally also removing ethylene from makeup ethylene line 102 to an ethylene header.

10. The method of claim 9, wherein after experiencing a partial or complete shutdown of secondary compressor, the pre-set open position of the HPLDV is set to between 100% open and 85% open.

11. The method of claim 9 wherein, after experiencing a partial or complete shutdown of secondary compressor, HPLDV remains at the pre-set open position until the reactor reaches a pre-set reduced pressure limit of at or below 1500 bar-g.

12. The method of claim 9 wherein, after experiencing a partial or complete shutdown of secondary compressor, HPLDV remains at the pre-set open position until the slope of the reactor gas density to reactor pressure exceeds 0.15.

13. The method of claim 9, wherein
allowing the flow of ethylene leaving the high-pressure recycle gas system 160 to travel through line 128, into line 106, and through first compressor recycled ethylene line 132 back to ethylene feed line 100, a feed is sent into either purge recycled ethylene line 122 and not to makeup ethylene line 102.

14. The method of claim 9, wherein
allowing the flow of ethylene leaving the high-pressure recycle gas system to travel through line 128, into line 106, and through first compressor recycled ethylene line 132 back to ethylene feed line 100, a feed is sent into both purge recycled ethylene line 122 and to makeup ethylene line 102.

15. The method of claim 9, wherein
removing ethylene from purge recycled ethylene line 122 to a liquid storage facility also includes removing the ethylene from makeup ethylene line 102 to an ethylene header.

* * * * *